(12) United States Patent
Barreto

(10) Patent No.: US 12,010,192 B2
(45) Date of Patent: *Jun. 11, 2024

(54) ADJUSTING ATTRIBUTES FOR AN ON-DEMAND SERVICE SYSTEM BASED ON REAL-TIME INFORMATION

(71) Applicant: Uber Technologies, Inc., San Francisco, CA (US)

(72) Inventor: Amos Barreto, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,910

(22) Filed: Jun. 23, 2022

(65) Prior Publication Data
US 2022/0329670 A1 Oct. 13, 2022

Related U.S. Application Data

(63) Continuation of application No. 17/140,731, filed on Jan. 4, 2021, now Pat. No. 11,503,133, which is a
(Continued)

(51) Int. Cl.
*H04L 67/55* (2022.01)
*H04L 67/04* (2022.01)
(Continued)

(52) U.S. Cl.
CPC ............ *H04L 67/55* (2022.05); *H04L 67/04* (2013.01); *H04L 67/52* (2022.05); *H04W 4/50* (2018.02);
(Continued)

(58) Field of Classification Search
CPC ....... H04L 67/306; H04L 67/22; H04L 67/24; H04L 12/14
See application file for complete search history.

(56) References Cited

U.S. PATENT DOCUMENTS

| 4,023,753 A | 5/1977 | Dobler |
| 5,604,676 A | 2/1997 | Penzias |

(Continued)

FOREIGN PATENT DOCUMENTS

| CA | 2889853 | 5/2014 |
| CN | 102495541 | 11/2012 |

(Continued)

OTHER PUBLICATIONS

Rosenblat, Alex, "Algorithmic labor and information asymmetries: A case study of Uber's drivers", International journal of communication 10: Jul. 2016.
(Continued)

*Primary Examiner* — Barbara B Anyan
(74) *Attorney, Agent, or Firm* — Mahamedi IP Law LLP

(57) ABSTRACT

A system and method for dynamically adjusting attributes for a network service is described. A computing system can determine a change that is to be implemented to an attribute of the network service. For each of a plurality of computing devices, the computing system can receive information associated with that computing device from a designated application operating on that computing device. The designated application is associated with the network service. The computing system automatically implements the change to at least one but not all of the plurality of computing devices based on the information received from each of the plurality of computing devices.

16 Claims, 4 Drawing Sheets

Related U.S. Application Data continuation of application No. 15/888,688, filed on Feb. 5, 2018, now Pat. No. 10,887,411, which is a continuation of application No. 14/671,480, filed on Mar. 27, 2015, now Pat. No. 9,888,087.

(60) Provisional application No. 61/973,154, filed on Mar. 31, 2014.

(51) Int. Cl.
*H04L 67/52* (2022.01)
*H04W 4/50* (2018.01)
*G06F 8/38* (2018.01)
*G06F 8/60* (2018.01)
*H04L 67/54* (2022.01)

(52) U.S. Cl.
CPC .................. *G06F 8/38* (2013.01); *G06F 8/60* (2013.01); *H04L 67/54* (2022.05)

(56) References Cited

U.S. PATENT DOCUMENTS

| | | | |
|---|---|---|---|
| 5,880,958 A | 3/1999 | Helms | |
| 5,945,919 A | 8/1999 | Trask | |
| 5,953,706 A | 9/1999 | Patel | |
| 6,212,393 B1 | 4/2001 | Suarez | |
| 6,356,838 B1 | 3/2002 | Paul | |
| 6,456,207 B1 | 9/2002 | Yen | |
| 6,516,056 B1 | 2/2003 | Justice et al. | |
| 6,756,913 B1 | 6/2004 | Ayed | |
| 7,080,019 B1 | 7/2006 | Hurzeler | |
| 7,370,336 B2 | 5/2008 | Husain | |
| 7,657,256 B2 | 2/2010 | Bates | |
| 7,817,990 B2 | 10/2010 | Pamminger | |
| 7,840,427 B2 | 11/2010 | O'Sullivan | |
| 8,339,251 B2 | 12/2012 | Roberts | |
| 8,554,608 B1 | 10/2013 | O'Connor | |
| 9,939,279 B2 | 4/2018 | Pan | |
| 9,971,618 B2 | 5/2018 | Lagergren | |
| 10,282,681 B2 | 5/2019 | Wang | |
| 10,282,684 B2 | 5/2019 | Truong | |
| 11,099,019 B2 | 8/2021 | Nickels | |
| 11,107,109 B2 | 8/2021 | Hayama | |
| 11,151,489 B2 | 10/2021 | Truong | |
| 2001/0037174 A1 | 11/2001 | Dickerson | |
| 2001/0056363 A1 | 12/2001 | Gantz | |
| 2002/0034292 A1 | 3/2002 | Tuoriniemi et al. | |
| 2002/0194129 A1 | 12/2002 | Furuya et al. | |
| 2003/0030666 A1 | 2/2003 | Najmi | |
| 2003/0182411 A1 | 9/2003 | Wang | |
| 2004/0024789 A1 | 2/2004 | Ditcharo et al. | |
| 2004/0049424 A1 | 3/2004 | Murray | |
| 2004/0060044 A1 | 3/2004 | Das | |
| 2004/0106399 A1 | 6/2004 | Ki | |
| 2004/0107110 A1 | 6/2004 | Gottlieb et al. | |
| 2004/0148347 A1* | 7/2004 | Appelman .............. H04L 51/04 709/204 | |
| 2004/0219933 A1 | 11/2004 | Faith | |
| 2004/0225520 A1 | 11/2004 | Aoki et al. | |
| 2004/0249818 A1 | 12/2004 | Isaac | |
| 2004/0260470 A1 | 12/2004 | Rast | |
| 2005/0246701 A1 | 11/2005 | Kanapathipillai | |
| 2005/0251333 A1 | 11/2005 | Adamzyk | |
| 2005/0278192 A1 | 12/2005 | Cantini et al. | |
| 2006/0004590 A1 | 1/2006 | Khoo | |
| 2006/0026270 A1 | 2/2006 | Sadovsky | |
| 2006/0034201 A1 | 2/2006 | Umeda et al. | |
| 2006/0059023 A1 | 3/2006 | Mashinsky | |
| 2006/0136254 A1 | 6/2006 | Greenstein | |
| 2006/0156140 A1 | 7/2006 | Van Haegendoren | |
| 2006/0200306 A1 | 9/2006 | Adamcyzk | |
| 2006/0217885 A1 | 9/2006 | Crady et al. | |
| 2006/0235739 A1 | 10/2006 | Levis | |
| 2006/0293937 A1 | 12/2006 | Sohm | |
| 2007/0006208 A1 | 1/2007 | Nguyen | |
| 2007/0130156 A1 | 6/2007 | Tenhunen | |
| 2007/0167182 A1 | 7/2007 | Tenhunen | |
| 2007/0255627 A1 | 11/2007 | Hallowell | |
| 2007/0276595 A1 | 11/2007 | Lewinson | |
| 2008/0052677 A1 | 2/2008 | Wolf | |
| 2008/0091342 A1 | 4/2008 | Assael | |
| 2008/0125964 A1 | 5/2008 | Carani | |
| 2008/0168244 A1 | 7/2008 | Chu Chen | |
| 2008/0177584 A1 | 7/2008 | Altaf et al. | |
| 2008/0195428 A1 | 8/2008 | O'Sullivan | |
| 2008/0270204 A1 | 10/2008 | Poykko | |
| 2008/0277183 A1 | 11/2008 | Huang | |
| 2008/0288767 A1 | 11/2008 | Wang | |
| 2008/0303694 A1* | 12/2008 | Ury ..................... G08G 1/07 340/907 | |
| 2009/0030885 A1 | 1/2009 | DePasquale | |
| 2009/0049288 A1* | 2/2009 | Weissman ................ G06F 8/70 712/E9.082 | |
| 2009/0143965 A1 | 6/2009 | Chang et al. | |
| 2009/0144827 A1 | 6/2009 | Peinado | |
| 2009/0176508 A1 | 7/2009 | Lubeck et al. | |
| 2009/0192851 A1 | 7/2009 | Bishop | |
| 2009/0216600 A1 | 8/2009 | Hill | |
| 2009/0222810 A1 | 9/2009 | Walston | |
| 2009/0254270 A1 | 10/2009 | Yu | |
| 2009/0326991 A1 | 12/2009 | Wei | |
| 2010/0017275 A1 | 1/2010 | Carlson | |
| 2010/0153279 A1 | 6/2010 | Zahn | |
| 2010/0211498 A1 | 8/2010 | Aabye et al. | |
| 2010/0299664 A1* | 11/2010 | Taylor ..................... G06F 8/65 717/173 | |
| 2010/0306355 A1 | 12/2010 | Lagergren | |
| 2011/0009098 A1 | 1/2011 | Kong | |
| 2011/0078680 A1 | 3/2011 | Lagergren | |
| 2011/0099040 A1 | 4/2011 | Felt et al. | |
| 2011/0153495 A1 | 6/2011 | Dixon | |
| 2011/0225257 A1 | 9/2011 | Tilden et al. | |
| 2011/0225269 A1 | 9/2011 | Yap et al. | |
| 2011/0238300 A1 | 9/2011 | Schenken | |
| 2011/0243553 A1* | 10/2011 | Russell ............... H04L 12/6418 398/115 | |
| 2011/0251951 A1 | 10/2011 | Kolkowitz et al. | |
| 2011/0301985 A1 | 12/2011 | Camp et al. | |
| 2011/0307879 A1 | 12/2011 | Ishida | |
| 2011/0320794 A1 | 12/2011 | Yang | |
| 2012/0059693 A1 | 3/2012 | Colodny et al. | |
| 2012/0072249 A1 | 3/2012 | Weir et al. | |
| 2012/0078671 A1 | 3/2012 | Mohebbi | |
| 2012/0078672 A1 | 3/2012 | Mohebbi | |
| 2012/0089326 A1 | 4/2012 | Bouve | |
| 2012/0215994 A1 | 8/2012 | Gravelle | |
| 2012/0232943 A1 | 9/2012 | Myr | |
| 2012/0266169 A1 | 10/2012 | Lagergren | |
| 2012/0306659 A1 | 12/2012 | Ben-Dayan | |
| 2013/0018795 A1 | 1/2013 | Kolhatkar et al. | |
| 2013/0036237 A1 | 2/2013 | Mutisya | |
| 2013/0055232 A1* | 2/2013 | Rajan ..................... G06F 8/658 717/170 | |
| 2013/0073327 A1 | 3/2013 | Edelberg | |
| 2013/0102333 A1 | 4/2013 | Dam | |
| 2013/0158861 A1 | 6/2013 | Lerenc | |
| 2013/0179215 A1 | 7/2013 | Slinin | |
| 2013/0346796 A1 | 12/2013 | Niwa | |
| 2014/0025410 A1 | 1/2014 | Churchman et al. | |
| 2014/0040605 A1 | 2/2014 | Futral | |
| 2014/0056526 A1* | 2/2014 | Scipioni ............... G06K 7/1417 382/192 | |
| 2014/0067488 A1 | 3/2014 | James | |
| 2014/0073300 A1* | 3/2014 | Leeder ..................... H04B 5/72 455/41.1 | |
| 2014/0087711 A1 | 3/2014 | Geyer | |
| 2014/0096126 A1 | 4/2014 | Gourlay | |
| 2014/0108201 A1 | 4/2014 | Frechett | |
| 2014/0149157 A1 | 5/2014 | Shaam et al. | |
| 2014/0156410 A1 | 6/2014 | Wuersch | |
| 2014/0156556 A1 | 6/2014 | Lavian | |
| 2014/0172727 A1 | 6/2014 | Abhyanker | |
| 2014/0258894 A1 | 9/2014 | Brown | |

(56) References Cited

U.S. PATENT DOCUMENTS

| | | |
|---|---|---|
| 2014/0279668 A1 | 9/2014 | Lievens |
| 2014/0279707 A1 | 9/2014 | Joshua |
| 2015/0032485 A1 | 1/2015 | Nelson |
| 2015/0046080 A1 | 2/2015 | Wesselius |
| 2015/0095198 A1 | 4/2015 | Eramian |
| 2015/0161554 A1 | 6/2015 | Sweeney |
| 2015/0161563 A1 | 6/2015 | Mehrabi |
| 2015/0161564 A1 | 6/2015 | Sweeney |
| 2015/0176997 A1 | 6/2015 | Pursche |
| 2015/0206267 A1 | 7/2015 | Khanna |
| 2015/0339923 A1 | 11/2015 | Konig |
| 2015/0345951 A1 | 12/2015 | Dutta |
| 2016/0019728 A1 | 1/2016 | Petrie |
| 2016/0027306 A1 | 1/2016 | Lambert |
| 2016/0104122 A1 | 4/2016 | Gorlin |
| 2016/0117610 A1 | 4/2016 | Ikeda |
| 2016/0138928 A1 | 5/2016 | Guo |
| 2016/0148167 A1 | 5/2016 | Li |
| 2016/0180346 A1 | 6/2016 | Cheng |
| 2016/0209220 A1 | 7/2016 | Laetz |
| 2016/0210675 A1 | 7/2016 | Smart |
| 2016/0224426 A1 | 8/2016 | Holden |
| 2016/0253617 A1 | 9/2016 | Truong |
| 2016/0334232 A1 | 11/2016 | Zhuang |
| 2016/0364678 A1 | 12/2016 | Cao |
| 2016/0364824 A1 | 12/2016 | Bryant |
| 2017/0116065 A1 | 4/2017 | Holden |
| 2017/0132540 A1 | 5/2017 | Haparnas |
| 2017/0169366 A1 | 6/2017 | Klein |
| 2017/0186126 A1 | 6/2017 | Marco |
| 2017/0192437 A1 | 7/2017 | Bier |
| 2017/0193404 A1 | 7/2017 | Yoo |
| 2017/0300848 A1 | 10/2017 | Shoval |
| 2017/0365030 A1 | 12/2017 | Shoham |
| 2018/0018683 A1 | 1/2018 | Yee |
| 2018/0102017 A1 | 4/2018 | Brinig |
| 2019/0044805 A1 | 2/2019 | Cobb |
| 2019/0095849 A1 | 3/2019 | Sweeney |
| 2019/0197460 A1 | 6/2019 | Truong |
| 2019/0243697 A1 | 8/2019 | Holden |
| 2019/0340554 A1 | 11/2019 | Jaffe |
| 2019/0347754 A1 | 11/2019 | Dicker |
| 2020/0175429 A1 | 6/2020 | Beaurepaire |
| 2021/0097452 A1 | 4/2021 | Niemiec |
| 2021/0152652 A1 | 5/2021 | Barreto |
| 2021/0121446 A1 | 7/2021 | Pan |
| 2021/0256649 A1 | 8/2021 | Stumpf |
| 2021/0319380 A1 | 10/2021 | Camp |
| 2022/0004973 A1 | 1/2022 | Truong |
| 2022/0027223 A1 | 1/2022 | Holden |
| 2022/0215499 A1 | 7/2022 | Dicker |

FOREIGN PATENT DOCUMENTS

| | | |
|---|---|---|
| CN | 105575103 | 5/2016 |
| JP | 2002-133592 | 5/2002 |
| JP | 2005-107942 | 4/2005 |
| JP | 2006-065857 | 3/2006 |
| JP | 2006-339810 | 12/2006 |
| JP | 2014-052867 | 3/2014 |
| JP | 2014-238831 | 12/2014 |
| WO | WO 1999/044186 | 2/1999 |
| WO | WO 0079390 | 12/2000 |
| WO | WO 2005/013588 | 2/2005 |

OTHER PUBLICATIONS

Furuhata, M., "Ridesharing" The State-of-the-Art and Future Directions, Apr. 15, 2013, Elsevier Ltd., Transportation Research Part B 57, pp. 28-46 (2013).

Huang, Y., Large Scale Real-time Ridesharing with Service Guarantee on Road Networks, Sep. 1-5, 2014, VLDB Endowment, vol. 7, No. 14, pp. 2017-2018 (2014).

Mukai, Dynamic Location Management for On-Demand Car Sharing System, 2005, In: Khosia R., Howlett R.J., Jain L.C. (eds) Knowledge-Based Intelligent Information and Engineering Systems, KES 2005. Lecture Notes in Computer Science, vol. 3681. Springer, Berlin, Heidelberg, pp. 768-744 (2005).

How does Uber Work? available at https://help.uber.com/h/738d1ff7-5fe0-4383-b34c-4a24809fd71e (Year: 2016).

International Search Report and Written Opinion in PCT/US2016/016437 dated Jun. 13, 2016.

IPRP in PCT/US2016/016437 dated Aug. 17, 2017.

1st Examination Report in AU2016215297 dated Sep. 18, 2017.

Second Examination Report in AU2016215297 dated May 10, 2018.

Third Examination Report in AU2016215297 dated May 15, 2018.

EESR in EP 16747223.2 dated Aug. 3, 2018.

Fourth Examination Report in AU2016215297 dated Sep. 18, 2018.

1st Examination Report in AU2018232915 dated Nov. 12, 2019.

\* cited by examiner

ADJUSTING ATTRIBUTES FOR AN ON-DEMAND SERVICE SYSTEM BASED ON REAL-TIME INFORMATION

CROSS-REFERENCE TO RELATED APPLICATIONS

This application is a continuation of U.S. patent application Ser. No. 17/140,731 filed Jan. 4, 2021, which is a continuation of U.S. patent application Ser. No. 15/888,688 filed Feb. 5, 2018, now U.S. Pat. No. 10,887,411, which is a continuation of U.S. patent application Ser. No. 14/671,480 filed Mar. 27, 2015, now U.S. Pat. No. 9,888,087 issued Feb. 6, 2018, which claims the benefit of U.S. Provisional Patent App. No. 61/973,154 filed Mar. 31, 2014; each of the aforementioned priority applications being hereby incorporated by reference in their respective entirety.

BACKGROUND OF THE INVENTION

An on-demand service system can arrange for a service to be provided to a user by a service provider. In some examples, the user and the service provider can individually operate a computing device that communicates with the on-demand service system. For example, the user and the service provider each operates a designated application that communicates with the service system on the user's device or the service provider's device, respectively.

DETAILED DESCRIPTION

Figure 1:
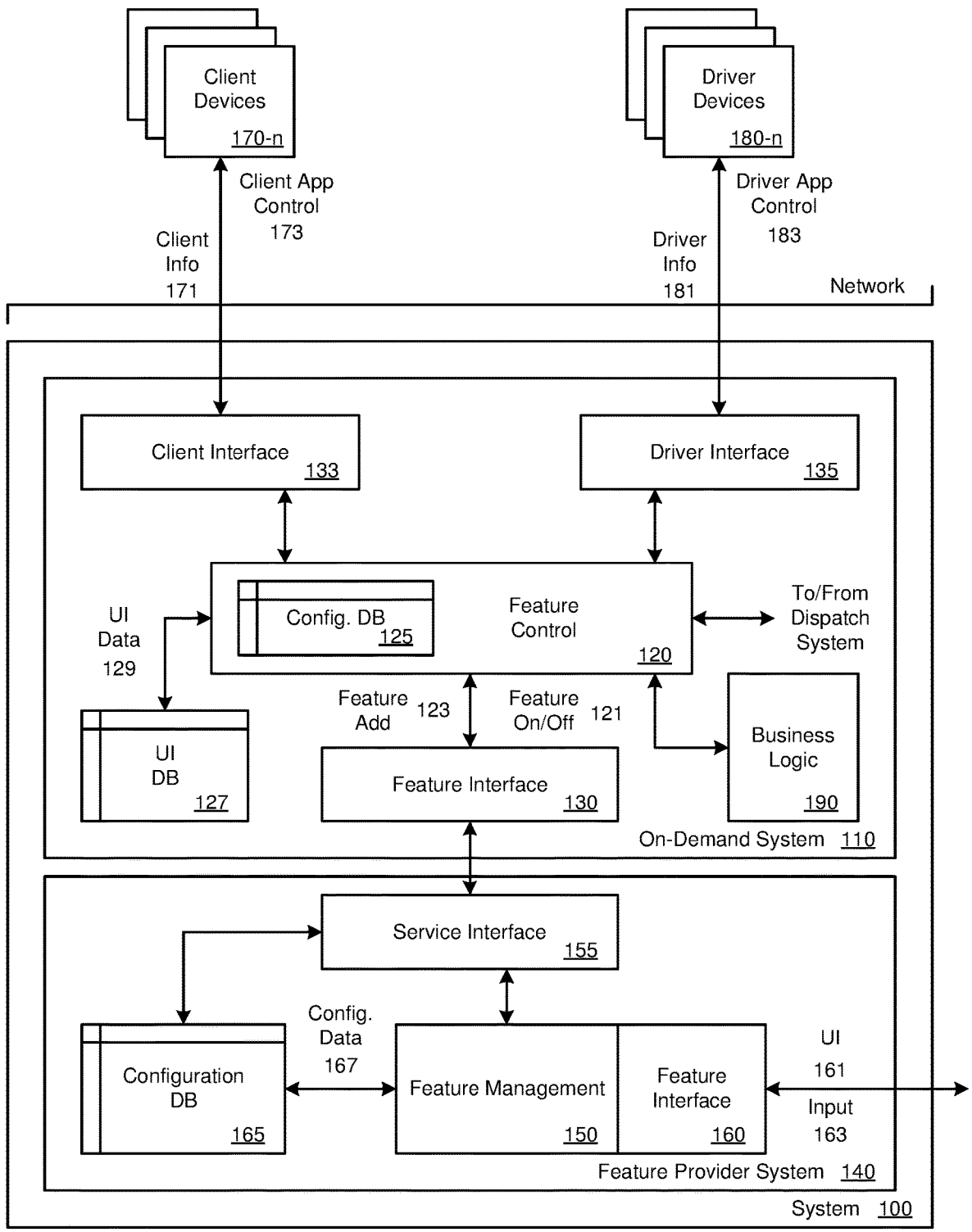
FIG. 1 illustrates an example system to adjust one or more attributes for a network service using real-time information.

Examples described herein provide for a system that enables a user (e.g., an administrative user) of the system to add, delete, edit, and/or switch on or off a feature(s) related to an attribute(s) of a network service. The system can also provisionally switch on or off a feature related to an attribute, such as turning on or off a feature for a set (or percentage) of users and/or computing devices. According to an example, an on-demand service system (that, at least in part, implements the network service) can communicate with a feature provider system in order to determine a change that is to be implemented to an attribute of the network service. The on-demand service system can use information received from client devices, service provider devices (e.g., driver devices), and/or current configuration information associated with the on-demand service system in order to automatically implement the change to the attribute of the network service.

As described herein, an attribute can correspond to a characteristic of the network service, such as, for example, a designated client application associated with the network service (e.g., operated on a client device to communicate with the on-demand service system), a designated service provider application associated with the network service (e.g., operated on a service provider device to communicate with the on-demand service system), a dispatch process utilized by the on-demand service system, a price determination process utilized by the on-demand service system, other processes utilized by the on-demand service system related to providing on-demand services, etc. A feature can be an aspect of an attribute that can be added, removed, adjusted, etc., such as a user interface of a designated application, text or graphics of the designated application, selectable features of the designated application, components used to implement the dispatch process or the price determination process, rules or policies for other processes used by the on-demand service system, etc., for implementing the network service.

Each of the on-demand service system and the feature provider system can be implemented on one or more computing systems or devices. According to examples, the on-demand service system and the feature provider system can be implemented on different computing systems or on the same computing system. In one example, the on-demand service system can communicate with a feature provider system periodically and/or in response to receiving a user input (or using a push or pull protocol via a persistent connection). The on-demand service system can check for updates or changes that are to be made to one or more attributes. Depending on examples, the on-demand service system can access a configuration database to determine whether a change is to be made to an attribute (e.g., toggle on or off a user interface feature of the designated application for certain devices) or receive, via push or pull protocol, instructions about a change that is to be made to an attribute. If the on-demand service system determines that a change is to be made, the next time client devices and/or service provider devices communicate with the on-demand service system, the on-demand service system can implement the change to one or more of the client devices and/or service provider devices based on information received from the devices and based on configuration data from configuration file(s).

In some examples, the on-demand service system can implement a change to an internal process that is utilized and/or performed by the on-demand service system for purposes of arranging on-demand services. As described herein, arranging a service can correspond to selecting a service provider to perform the service for a requesting user. In one example, a configuration file, which corresponds to a particular feature or an attribute, can instruct the on-demand service system to adjust a dispatch (or driver selection) mechanism or process in a particular geographic region (e.g., increase or decrease a dispatch radius for selecting drivers as compared to a previous dispatch radius). As another example, a configuration file can be used to perform a test operation for the on-demand service system (e.g., A/B testing). The configuration file can instruct the on-demand service system to select drivers by distance for drivers that are in one geographic region and select drivers by estimated time of arrival for drivers that are in another geographic region.

As used herein, a client device, a service provider device, a driver device, and/or a computing device refer to devices corresponding to desktop computers, cellular devices or smartphones, personal digital assistants (PDAs), laptop computers, tablet devices, television (IP Television), etc., that can provide network connectivity and processing resources for communicating with the system over a network. A driver device can also correspond to other devices of a transit object, such as custom hardware or on-board vehicle computers, etc. The client device and/or the driver device can also operate each an application configured to communicate with the system (e.g., a designated application).

Although examples of the network service described herein relate to an on-demand transport service, the on-demand service system can also enable other location-based on-demand services to be arranged between individuals using the computing devices described. For example, the on-demand service system can provide a delivery service (e.g., food delivery, messenger service, or product shipping), a food service (e.g., food trucks), or an entertainment service (e.g., mariachi band, string quartet), and a service provider, such as a driver, food provider, band, etc., can be selected by the on-demand service system to provide the service for a user.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates an example system to dynamically adjust an attribute(s) for a network system using real-time information. An on-demand service system can communicate with a feature provider system, which notifies or instructs the on-demand service system as to which features of attributes should be toggled on or off (or provisionally turned on or off). For example, the feature provider system can provide a user interface to enable a user (e.g., an administrative user of the feature provider system and/or the on-demand service system) to cause the system to toggle on or off features for certain devices or for certain processes performed by the on-demand service system based on real-time conditions, such as time of day, device or application information, device location, current dispatch state information, etc. In this manner, the on-demand service system and the feature provider system can combine to dynamically implement changes to attributes of the on-demand service system with specific granularity.

According to an example, a system 100 includes an on-demand service system 110 (also referred to as the on-demand system 110) and a feature provider system 140. The on-demand system 110 includes a feature control component 120, a feature interface 130, a client interface 133, a driver interface 135, a user interface database 127, and a business logic 190, and the feature provider system 140 includes a feature management component 150 (which provides a feature interface 160), a service interface 155, and a configuration database 165. A plurality of client devices 170 and a plurality of driver devices 180 can also communicate with the system 100 over one or more networks. The components of the system 100 can combine to dynamically adjust an attribute for the on-demand system 110 based on real-time (or close to real-time) information received from the client devices 170 and/or the driver devices 180, and/or current configuration information associated with the on-demand system 110. Logic can be implemented with various applications (e.g., software) and/or with hardware of a computer system that implements the system 100.

Depending on implementation, one or more components of the system 100 can be implemented on network side resources, such as on one or more servers. The system 100 can also be implemented through other computer systems in alternative architectures (e.g., peer-to-peer networks, etc.). As an addition or an alternative, some or all of the components of the system 100 can be implemented on client devices, such as through applications that operate on the client devices 170 and/or the driver devices 180. For example, a client application, such as a designated service application, can execute to perform one or more of the processes described by the various components of the system 100. The system 100 can communicate over a network, via a network interface (e.g., wirelessly or using a wireline), to communicate with the one or more client devices 170 and the one or more driver devices 180.

The system 100 can communicate, over one or more networks, with client devices 170 and driver devices 180 using a client interface 133 and a driver interface 135, respectively. The device interfaces 133, 135 can manage communications between the system 100 and remote computing devices. The client devices 170 and driver devices 180 can individually operate a designated service application that can interface with the device interfaces 133, 135 to communicate with the system 100. According to some examples, the applications can include or use an application programming interface (API), such as an externally facing API, to communicate data with the device interfaces 133, 135. The externally facing API can provide access to the system 100 via secure access channels over the network through any number of methods, such as web-based forms, programmatic access via restful APIs, Simple Object Access Protocol (SOAP), remote procedure call (RPC), scripting access, etc.

In some examples, the feature control component 120 of the on-demand system 110 can communicate, via the feature interface 130 and the service interface 155, with the feature provider system 140. The feature interface 130 and the service interface 155 can enable the on-demand system 110 and the feature provider system 140 to communicate with each other and exchange data. For example, the feature interface 130 and the service interface 155 can implement a protocol, such as a push protocol or pull protocol, which enables the feature control component 120 to check for updates about what changes need to be made since the last communication. For example, a push protocol can enable the feature provider system 140 to push information about updates to the on-demand system 110 through a persistent connection (e.g., web sockets, SPDY, transmission control protocol, etc.). The feature control component 120 can use the interfaces 130, 155 to communicate with the feature provider system 140 periodically (e.g., every five seconds, seven seconds, etc.) and/or in response to receiving a user input that instructs the feature control component 120 to ping or message the feature provider system 140 for data. By communicating with the feature provider system 140, the feature control component 120 can determine whether there is a change that is to be implemented to an attribute of the on-demand system 110.

According to an example, the configuration database 165 can store a plurality of configuration files for a plurality of features that each corresponds to an attribute of the on-demand system 110. As described herein a configuration file refers to configuration data that is stored in a file, in memory, or other data structure or store. The configuration database 165 can be updated and maintained by the feature management component 150 based on user input. In some examples, a user (e.g., an administrator) of the system 100 can access and interact with a user interface 161 provided by the feature interface 160 of the feature management component 150 to create, delete, edit, and/or toggle on or off features of different attributes of the on-demand system 110 (by providing user input 163). For example, the user interface 161 can provide a plurality of options to enable the user to create, delete, edit, and/or toggle on or off features. The options can be extensible so that options can be added or removed for creating a configuration file.

For a particular feature of an attribute, for example, the user can create a configuration file by providing configuration data 167 via user input 163, including (i) providing a name or identifier, (ii) specifying a type of feature, (iii) providing a value for that feature, such as a price, value, or threshold number that pertains to the feature (e.g., a distance for a dispatch radius, a total number of devices to receive a particular user interface feature, etc.), (iv) specifying a geographic region for that feature (e.g., by accessing or referencing a geofence database that stores a plurality of geofences that each define a geographic region), (v) specifying a time or time interval (e.g., when the feature should be toggled on or off, or how long the feature should be toggled on or off if based on a schedule), (vi) specifying a device or device type (e.g., by brand or operating system used by the device), (vii) specifying an application version, (viii) specifying a user or set of users, (ix) specifying a percentage of users to expose a feature to (e.g., 20% of users see feature A, while 80% of the users see features B on the user interface of the designated client application), and/or (x) providing other information for the configuration file.

The feature interface 160 can receive the user inputs 163 and the feature management component 150 can create and store the configuration file with corresponding configuration data 167 based on the user inputs 163. The configuration data 167 stored with a configuration file can instruct the feature control component 120 to implement a corresponding feature to only those devices 170, 180 and/or to only those components of the on-demand system 110 that satisfy the conditions specified by the configuration file when the configuration file is toggled on. In one example, a configuration file can be toggled on or off for a set of client devices or driver devices at a particular time of day (e.g., at 8 am) or manually by the administrative user.

In addition, the feature management component 150 can enable the administrative user to toggle on or off the features via the user input 163. For example, each of the configuration files in the configuration database 165 can include a value (e.g., an active value) that indicates whether the corresponding feature is toggled on or off (e.g., is the feature active?). A "true" or "yes" value indicates that the feature is active or on while a "false" or "no" value indicates that the feature is inactive or off. The administrative user can schedule a particular feature to be automatically turned on or off or manually adjust the active value in order to turn on or off a particular feature.

According to some examples, the feature control component 120 can periodically communicate with the feature provider system 140 to determine which features are toggled on or off. Depending on implementation, in one example, when the feature control component 120 pings or messages the feature provider service 140, the feature management component 150 can provide an update to the feature control component 120 indicating which changes (if any) have been made since the last communication. The feature management component 150 can keep track of a timestamp of the last communication between the feature control component 120 and the feature management component 140 and which features were toggled on or off at that time, and perform a comparison at the subsequent communication to determine which features changed states. For example, as compared to the previous time the on-demand system 110 communicated with the feature provider system 140, a new feature 123 may have been added as a configuration file or an existing feature 121 may have been turned on or off (or deleted). The feature control component 120 can receive, from the feature management 150, the identifiers of the configuration files that have changed states from the previous time and access the configuration database 165 to determine the configuration data 167 for those configuration files.

As an addition or an alternative, the feature control component 120 can access the configuration database 165 to determine which features are toggled on or off. For example, the feature control component 120 can maintain its own configuration database 125 that indicates the current state of the attributes of the on-demand system 110 (e.g., which features are on or off). The configuration database 125 can indicate which configuration files are currently active (e.g., have features that are toggled on) and/or which configuration files are currently inactive. When the feature control component 120 communicates with the feature provider system 140, the feature control component 120 can read the active values of the configuration files from the configuration database 165 to determine which features are toggled on or toggled off at the present time. The feature control component 120 can perform a compare operation with configuration information from the configuration database 125 and the configuration information read from the configuration database 165 to determine which changes (if any) have been made since the last time the feature control component 120 accessed the configuration database 165.

For example, if a previously toggled-off feature (or non-existing feature) is now toggled-on (or created and toggled-on) at the time the feature control component 120 communicates with the feature provider system 140, the feature control component 120 determines that a change is to be implemented. Similarly, if a previously toggled-on feature is now toggled-off (or deleted) at the time the feature control component 120 communicates with the feature provider system 140, the feature control component 120 also determines that a change is to be implemented. The feature control component 120 can determine the identifiers of the configuration files that have changed states from the comparison and access the configuration database 165 to determine the configuration data 167 for those configuration files. Depending on either implementation, by determining that a change is to be implemented to an attribute of the on-demand system 100, the feature control component 120 can identify the configuration file, and use the corresponding configuration data 167 and real-time information to perform the implementation process.

The on-demand system 110 can receive real-time client information 171 associated with the client devices 170 and real-time driver information 181 associated with the driver devices 180. For example, when a designated client application and/or a designated driver application is being run on a client device 170 and/or a driver device 180, respectively, the feature control component 120 can receive client information 171 and/or driver information 181 from the respective designated application periodically and/or in response to receiving user input on those devices 170, 180. According to examples, the information 171, 181 received from the devices 170, 180 includes at least one of (i) a current location of a respective computing device, (ii) a device type of the respective computing device, (iii) a user identifier associated with the respective computing device, or (iv) a version information for the designated application operating on the respective computing device, or other information associated with the designated application or the respective computing device.

When the feature control component 120 determines that a change to a feature is to be made, the feature control component 120 can use (i) the corresponding configuration data 167, (ii) the client information 171 and/or driver information 181, and (iii) other known information (such as current time or date) to automatically implement the change to the designated application on the appropriate devices. For example, the designated applications can communicate with the on-demand system 110 using a protocol in which client information 171 and/or device information 181 is transmitted (e.g., a ping) to the on-demand system 110 and the on-demand system 110 provides a response. In some examples described, the on-demand system 110 can provide a response that corresponds to a client application control signal 173 or a driver application control signal 183 that causes the respective designated service applications to implement a corresponding change.

In some examples, the feature control component 120 can also access a user interface database 127 that stores different user interface features, selectable features, texts, graphics, etc., for the designated client application and designated driver application. A configuration file can correspond to a user interface feature that is to be turned on or off (e.g., added or removed from a user interface of a designated application on the client device 170 or the driver device 180). In such an example, the feature control component 120 can use the configuration data 167 of that configuration file to determine which user interface feature to add or remove by accessing the user interface database 127 and identifying the appropriate user interface data 129. Although the user interface database 127 is shown to be a part of the on-demand service system 110, depending on implementation, the user interface database 127 can be a part of the feature provider system 140 or the dispatch system (not shown in FIG. 1) and can be updated by inputs provided by a user of system 100.

According to another example, the feature control component 120 can determine that a change is to be implemented to a process utilized or performed by the on-demand service system (as opposed to a feature on the designated service applications). A configuration file that has been toggled on, for example, can correspond to a feature in which the dispatch system of the on-demand system 110 uses, for a particular city or metropolitan area, an additional factor when making a driver selection as compared to a previous (or default) driver selection mechanism in which fewer factors are used. In such an example, the feature control component 120 can determine the configuration data 167 corresponding to that configuration file, determine current dispatch system configuration information (e.g., received from the dispatch system), and automatically implement the change to the dispatch system using the configuration data 167 and the current dispatch system configuration information. The feature control component 120 can provide a control signal corresponding to the change to the dispatch system.

Although the dispatch system is not illustrated in FIG. 1, the on-demand system 110 can include the dispatch system and/or be in communication with the dispatch system. The dispatch system can receive requests for transport services from users, select drivers for the users to perform the transport services, provide pricing for the transport services, and perform payment transactions for the transport services.

As an example, a configuration file can instruct the feature control component 120 to increase a maximum time a driver has to accept a transport request for only those drivers that are currently in a particular geographic region (e.g., in San Francisco, California) from a default time (e.g., ten seconds) to a new time (e.g., twenty seconds). Initially, for example, the configuration file can be toggled off. When the user (via the feature interface 160) toggles the configuration file on, at a next time the feature control component 120 pings the feature provider service 140 (and/or or accesses the configuration database 165), the feature control component 120 can determine that the feature has been turned on and determine that a change is to be implemented to that feature.

The feature control component 120 can receive driver information 181 from the driver devices 180 and identify those drivers that are in the geographic region indicated by the configuration file. The feature control component 120 can then automatically implement the change to the feature to those driver devices 180 that are in the specified geographic region by transmitting a driver application control 183 signal corresponding to the change to the designated driver applications on the driver devices 180. In addition, the feature control component 120 can also implement the change to the feature to the dispatch system so that the dispatch system is informed of the increased acceptance time. In this manner, the increased acceptance time feature for drivers that are located in San Francisco, California (as specified by the San Francisco geofence, for example) can be implemented on their respective driver devices 180 whereas the increased acceptance time feature for drivers that are located elsewhere are not implemented on their respective driver devices 180.

As an addition or an alternative, in some examples, the on-demand system 110 can be implemented on one server or computing device (or one set of servers) while the feature provider system 140 can be implemented on another server or computing device (or another set of servers). In other examples, although two separate systems 110, 140 are shown in FIG. 1, the feature provider system 140 can be included with the on-demand system 110 as a single system and/or in a single server or computing device. Still further, in another example, multiple on-demand systems 110 and/or multiple feature provider systems 140 can be used to implement system 100.

For example, multiple systems can communicate with the feature provider system 140 via the service interface 155 and the respective systems' feature interface 130 in order to determine and/or implement changes to attributes of the network service. In another example, the business logic 190 of the on-demand system 110 can instruct the feature control component 120 to control one or more other systems of the network service. The business logic 190 can be configured with one or more rules or parameters, for example, to instruct the feature control component 120 to implement the appropriate change to a feature of another system of the network service.

According to some examples, the on-demand system 110 can represent a plurality of systems and platforms. For example, the on-demand system 110 can be running on any operating system (e.g., Windows, Linux, etc.) and running any language platform (e.g., Java, Node, Python, etc.). In one implementation, the feature control component 120 can use grammar language to describe the configuration from the configuration database 165 in order for the feature control component 120 to work consistently across a plurality of systems and platforms.

Methodology

Figure 2:
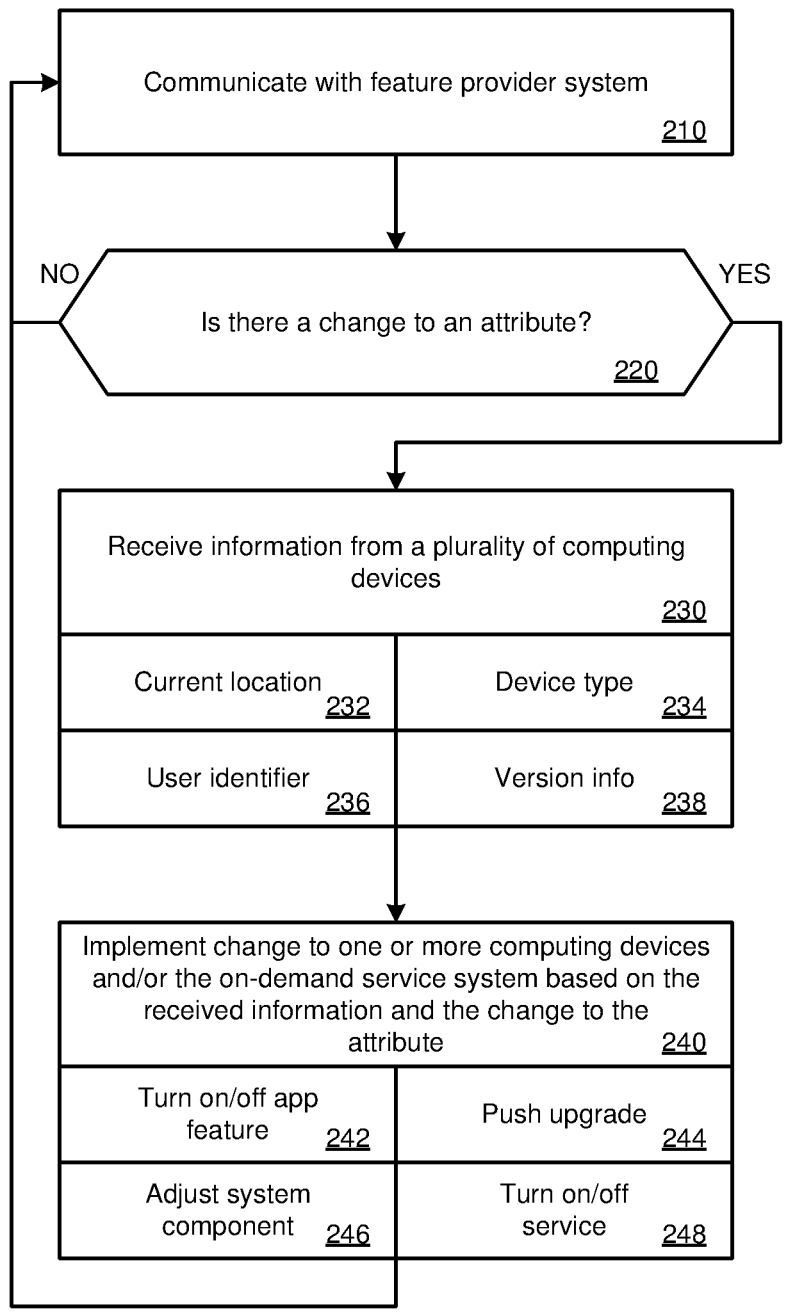
FIG. 2 illustrates example method for adjusting one or more attributes for a network service using real-time information.

FIG. 2 illustrates an example method for adjusting one or more attributes for a network service using real-time information. A method such as described by an example of FIG. 2 can be implemented using, for example, components described with an embodiment of FIG. 1. Accordingly, references made to elements of FIG. 1 are for purposes of illustrating a suitable element or component for performing a step or sub-step being described.

Referring to FIG. 2, an on-demand system 110 can communicate with a feature provider system 140 (210). Depending on implementation, the on-demand system 100 can communicate with the feature provider system 140 periodically, in response to user input (received at the on-demand system 110 or the feature provider system 140), and/or as part of a scheduled push or pull protocol using a persistent connection. The feature provider system 140 can include a configuration database 165 that stores a plurality of configuration files for a plurality of features associated with the network service. The configuration files can be turned on or off based on user input or based on a set schedule, so that the corresponding features of attributes can be indicated to be changed.

The on-demand system 110 can communicate with the feature provider system 140 to determine whether there is a change that is to be implemented to an attribute of the network service (220). For example, at time t=t1, the feature control component 120 can determine which features have been turned on or off as compared to a previous time, t=t0 (e.g., the previous time the on-demand system 110 communicated with the feature provider system 140). If no change is to be made to an attribute, the feature control component 120 does not implement a change. The feature control component 120 can communicate with the feature provider system 140 at the next instance in time. On the other hand, if the feature control component 120 determines that one or more changes is to be implemented to an attribute, the feature control component 120 can identify the one or more configuration files that have been toggled on or off (or created or deleted) and that instructs the one or more changes that are to be made to the attribute.

For example, a configuration file can instruct the feature control component 120 to use a vehicle selection interface that has four vehicle type options (as opposed to three options) for the designated client applications on client devices 170 that are in a particular geographic region (e.g., Los Angeles, California). Previously, at time t=t0, the configuration file may have been toggled off. After the configuration file is toggled on, at time t=t1, when the feature control component 120 communicates with the feature provider system 140, the feature control component 120 can determine that a change is to be implemented to a designated client application. The feature control component 120 can identify the configuration file from the configuration database 165 and determine the corresponding configuration data 167.

The on-demand system 110 can receive information from the client devices 170 and/or the driver devices 180 (230). For example, the client devices 170 and/or the driver devices 180 can individually operate a designated service application that communicates with the on-demand system 110. Depending on implementation, the on-demand system 110 can receive information initially when a respective user or driver launches or opens the respective designated service application and/or periodically afterwards. The devices 170, 180 can send information including (i) a current location of a respective computing device (232), (ii) a device type of the respective computing device (234), (iii) a user identifier associated with the respective computing device, such as a user identifier of the client or customer or the user identifier of the driver (236), and/or (iv) a version information for the designated application operating on the respective computing device (238).

The feature control component 120 can implement the change to one or more of the client devices 170 and/or the driver devices 180 and/or to different other aspects of the on-demand service system based on the received information and the configuration data 167 corresponding to the changed to the attribute (240). Referring back to the example, the configuration data 167 of the configuration file can instruct the feature control component 120 to use a vehicle selection interface that has four choices (as opposed to three choices) for the designated client applications on client devices 170 that are in the particular geographic region. The feature control component 120 can use the received application and/or application version information to determine which devices operate the client application and also determine which devices are currently located in the geographic region. The feature control component 120 can then implement the change to only those devices that satisfy the conditions specified in the configuration file. In one example, the feature control component 120 can access a user interface database 127 to determine the user interface data 129 of the vehicle selection interface that has four choices (as opposed to three choices) so that the user interface data 129 can be transmitted to the identified devices as part of or along with client application control 173. The client application control 173 can cause the designated client applications to implement the corresponding change.

Depending on implementation, a variety of different changes can be implemented to an attribute(s) of the on-demand system 110. In one example, a particular application user interface feature can be turned on or off (e.g., added, removed, exchanged) on the client application and/or driver application (242). This can include changing selectable features, providing different text, changing graphics (e.g., instead of an image of an automobile moving on a map, such as on a default view of a vehicle type, display an image of a trolley or a kitten or a football), changing colors or configurations of the application, etc. In some examples, certain applications can also be changed by pushing an application upgrade for applications of certain versions (244). For example, if a set of drivers use application version 2.5, but version 2.3 (e.g., the older version) is working better with less glitches, toggling a feature to cause the older version to be used (for a period of time while version 2.5 is being modified or fixed) can cause the feature control component 120 to determine which drivers are operating the application with version 2.5. The feature control component 120 can then automatically implement the change to those set of drivers to push the upgrade to the version 2.3.

In another example, the feature control component 120 can implement a change to a system component or process (246). A feature can correspond to a rule or policy used for dispatching drivers, determining pricing, processing payment, etc., that is performed by the dispatch system and/or the on-demand system 110. Such rules or policies can be dynamically adjusted by the feature control component 120. Still further, other examples include turning on or off a service, thereby causing a change to user interface features of the designated service applications as well as to components or features of the dispatch system and/or the on-demand system 110 (248). For example, a service can correspond to sharing a fare between multiple users for a transport service. The fare sharing service can be enabled for only those users that are administrators of the system (as opposed to other customers who are not administrators) (e.g., for purposes of testing before public release). A corresponding user interface feature (e.g., a menu option) to use the fare sharing service can be toggled on for client applications stored on devices belonging to only administrators. In addition, the feature control component 120 can enable the fare sharing service to be performed by the on-demand system 110 for only those administrators.

In another example, as another use case scenario, transport services can be subject to different rules or regulations based on different countries or geographic regions. The configuration files can cause different rules or regulations to be implemented for different users based on whether the user is a client or a driver, and based on the current location of the users. For example, clients in a certain state or region can have a user interface feature that is toggled on for their client applications that enable a client to notify the on-demand system 110 if the driver appears to be under the influence. Other clients in other regions may not have the same user interface feature toggled on.

Use Case Examples

For purpose of illustration, a number of use case examples are described below. In one example, an entity that provides the network service can offer a promotion or a special service for users in a geographic region. This promotion or special service can be available for a duration of time or permanently until turned off by an administrative user of the entity. For example, a transport service arrangement system can typically offer a set of vehicle types that a user can select when making a transport request for a transport service. An administrative user can create a special service that can be requested by users in a given geographic region during a specified duration of time (e.g., for a month, for a week, or ending on a particular date and/or time, etc.). The special service can correspond to a specific vehicle type that was previously unavailable in that geographic region or a delivery service of food (or kittens, for example, in connection with a partnership with an animal shelter) to a specified location.

When the configuration file for the special service is toggled on, for example, at the feature provider system 140, the on-demand system 110 can determine that a change is to be implemented to an attribute (e.g., the client application and/or the dispatch system) of the network service. The on-demand system 110 can determine which client applications on which client device 170 are to be changed so that the user interface feature corresponding to the special service, for example, are to be included and/or displayed by those client applications. The on-demand system 100 can receive client information 171 from the client devices 170, determine (based on the geofence associated with the geographic region specified in the configuration file) which of those client devices 170 are in the geofence of that geographic region, and cause the client applications on those client devices 170 to implement the change to the user interface. In one example, the change can correspond to displaying an option to select the special service (e.g., a new selectable feature) that was previously not available on the user interface of the client application. As an addition or an alternative, the change can correspond to displaying graphic images corresponding to the special service (e.g., images of kittens or ice cream cones, etc.) in place of default images of automobiles associated with default transport services. In such an example, these images would replace the images of automobiles that would otherwise been displayed on a map user interface to show the close to real-time locations of those automobiles. In this manner, the client devices 170 that are in the geographic region may display other transport service offerings as compared to client devices 170 that are not in that geographic region, thereby changing the attribute for the network service for certain groups of users.

If the configuration file specifies a duration of time (e.g., three days) in which the special service is made available to client devices in the geographic region, when the duration of time elapses, the feature control component 120 can again implement a change to the attribute to cause the attribute to revert back to the previous state. In this example, after the duration of the special service ends, the feature control component 120 can cause the new selectable feature for the special service to be removed from the user interface of the client application and the default feature(s) to be present and/or cause the graphic images corresponding to the special service to be removed from the map user interface of the client application.

In another example, a configuration file, when toggled on, can cause the client applications associated with a specific group of users to display different user interface features than client applications associated with another group of users. The group of users can be identified by user identifiers, application identifiers, email domain names, mobile device identification numbers, etc. The group of users may also be identified by flagging the users' accounts as belonging to a particular organization or being an employee of the entity that offers the network service.

Still further, in another use case example, the on-demand system 110 can determine that a change is to be implemented to a driver selection process performed by the on-demand system 110 (and/or the dispatch system). The on-demand system 100 can determine which set of rules (that specify the manner in which a driver selection process is to be performed) is to apply to a particular geographic region and/or to drivers and users in that region. For example, a configuration file can specify that when the dispatch system receives a request for a transport service from a user operating a client device 170 in that region (or receives a request that specifies a pickup location in that region), the dispatch system is to identify available drivers that are within a predetermined distance (e.g., three miles) from the location of the client device 170 (or the specified pickup location). The dispatch system would not implement this change to other regions, so that when the dispatch system receives a request for a transport service from a user operating a client device 170 in another geographic region (or receives a request that specifies a pickup location in another geographic region), the dispatch system can continue to identify available drivers that are within the previously specified distance (e.g., five miles) from the location of the client device 170 (or the specified pickup location).

In another example, a configuration file can specify that the dispatch system is to select a driver from a set of available drivers to provide the transport service for a user by determining the driver being closest to the pickup location of the user (e.g., having the shortest distance as compared to other available drivers) when performing the driver selection process for the user. Alternatively, a configuration file can specify that the dispatch system is to select a driver from a set of available drivers to provide the transport service for a user by determining the driver having the shortest estimated travel time to the pickup location of the user when performing the driver selection process for the user.

Hardware Diagrams

Figure 3:
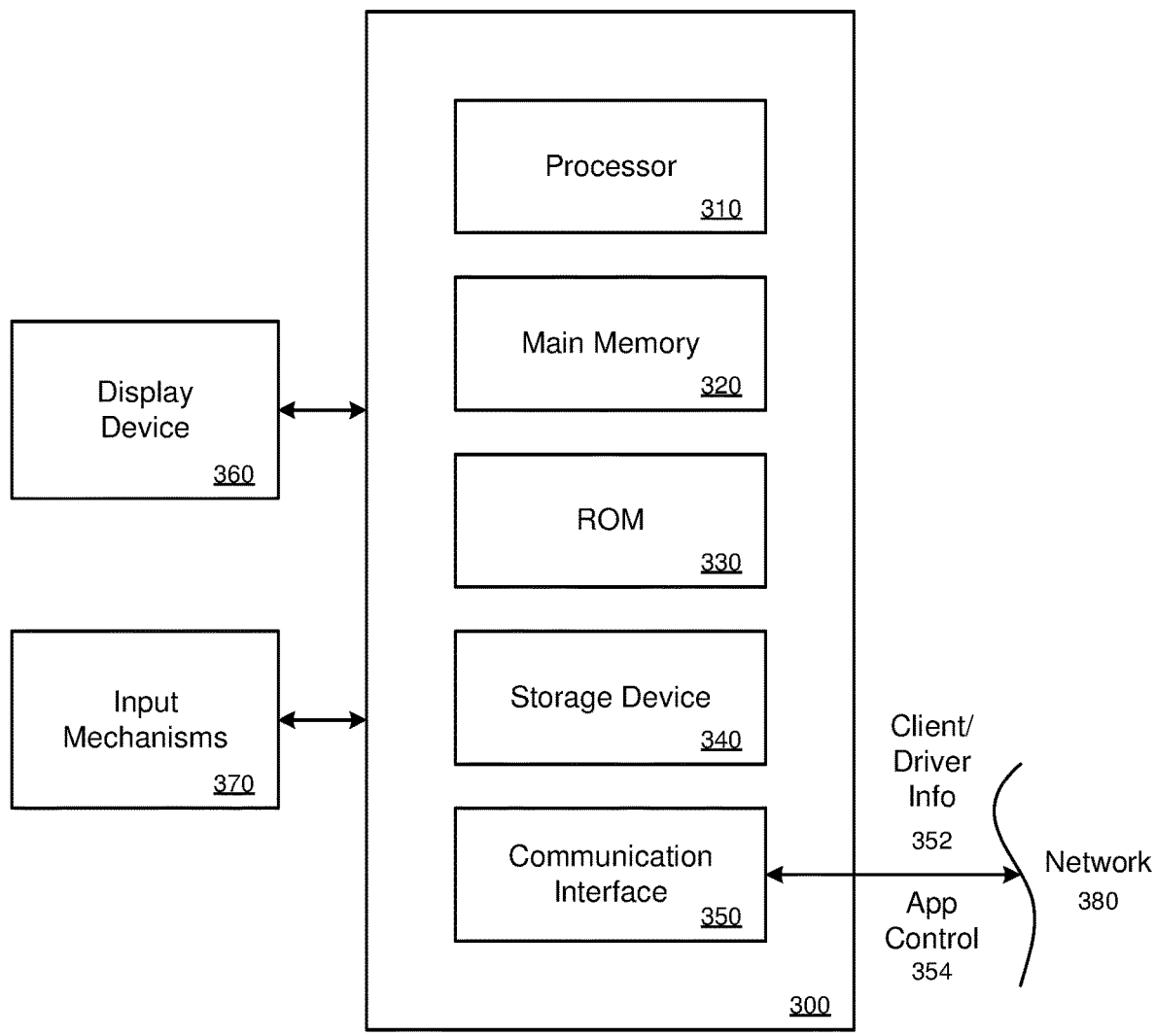
FIG. 3 is a block diagram that illustrates a computer system upon which examples described herein may be implemented.

FIG. 3 is a block diagram that illustrates a computer system upon which examples described herein may be implemented. For example, in the context of FIG. 1, the system 100 may be implemented using one or more computer systems such as described by FIG. 3. The system 100 may also be implemented using a combination of multiple computer systems as described by FIG. 3.

In one implementation, a computer system 300 includes processing resources 310, a main memory 320, a read-only memory (ROM) 330, a storage device 340, and a communication interface 350. The computer system 300 includes at least one processor 310 for processing information and the main memory 320, such as a random access memory (RAM) or other dynamic storage device, for storing information and instructions to be executed by the processor 310. The main memory 320 may also be used for storing temporary variables or other intermediate information during execution of instructions to be executed by the processor 310. The computer system 300 may also include the ROM 330 or other static storage device for storing static information and instructions for the processor 310. The storage device 340, such as a solid-state device, a magnetic disk, or an optical disk, is provided for storing information and instructions. For example, the storage device 340 can correspond to a computer-readable medium that stores feature management and feature control instructions for performing operations discussed with respect to FIGS. 1 through 2. In another example, the storage device 340 can store configuration data and user interface data, such as discussed with respect to FIGS. 1 through 2.

The communication interface 350 can enable the computer system 300 to communicate with one or more networks 380 (e.g., cellular network) through use of the network link (wireless and/or using a wire). Using the network link, the computer system 300 can communicate with a plurality of devices, such as the mobile computing devices of the clients and service providers. According to some examples, the computer system 300 can determine a change to be implemented to an attribute of the on-demand service system. The computer system 300 can also receive client and/or driver information 352 from the client and driver devices, respectively via the network link. The processor 310 can use the client and/or driver information 352 received from the devices (as well as other information) to determine which device(s) to implement the change to. The processor 310 can transmit, via the communication interface 350 over the network 380, application controls 354 to the respective devices that have been identified as requiring the change. The application controls 354, for example, can cause changes to be implemented to a designated service application on a client device(s) and/or a driver device(s).

The computer system 300 can also include a display device 360, such as a cathode ray tube (CRT), an LCD monitor, or a television set, for example, for displaying graphics and information to a user. An input mechanism 370, such as a keyboard that includes alphanumeric keys and other keys, can be coupled to the computer system 300 for communicating information and command selections to the processor 310. Other non-limiting, illustrative examples of input mechanisms 370 include a mouse, a trackball, touch-sensitive screen, or cursor direction keys for communicating direction information and command selections to the processor 310 and for controlling cursor movement on the display 360.

Examples described herein are related to the use of the computer system 300 for implementing the techniques described herein. According to one example, those techniques are performed by the computer system 300 in response to the processor 310 executing one or more sequences of one or more instructions contained in the main memory 320, such as feature management and feature control instructions. Such instructions may be read into the main memory 320 from another machine-readable medium, such as the storage device 340. Execution of the sequences of instructions contained in the main memory 320 causes the processor 310 to perform the process steps described herein. In alternative implementations, hard-wired circuitry may be used in place of or in combination with software instructions to implement examples described herein. Thus, the examples described are not limited to any specific combination of hardware circuitry and software.

Figure 4:
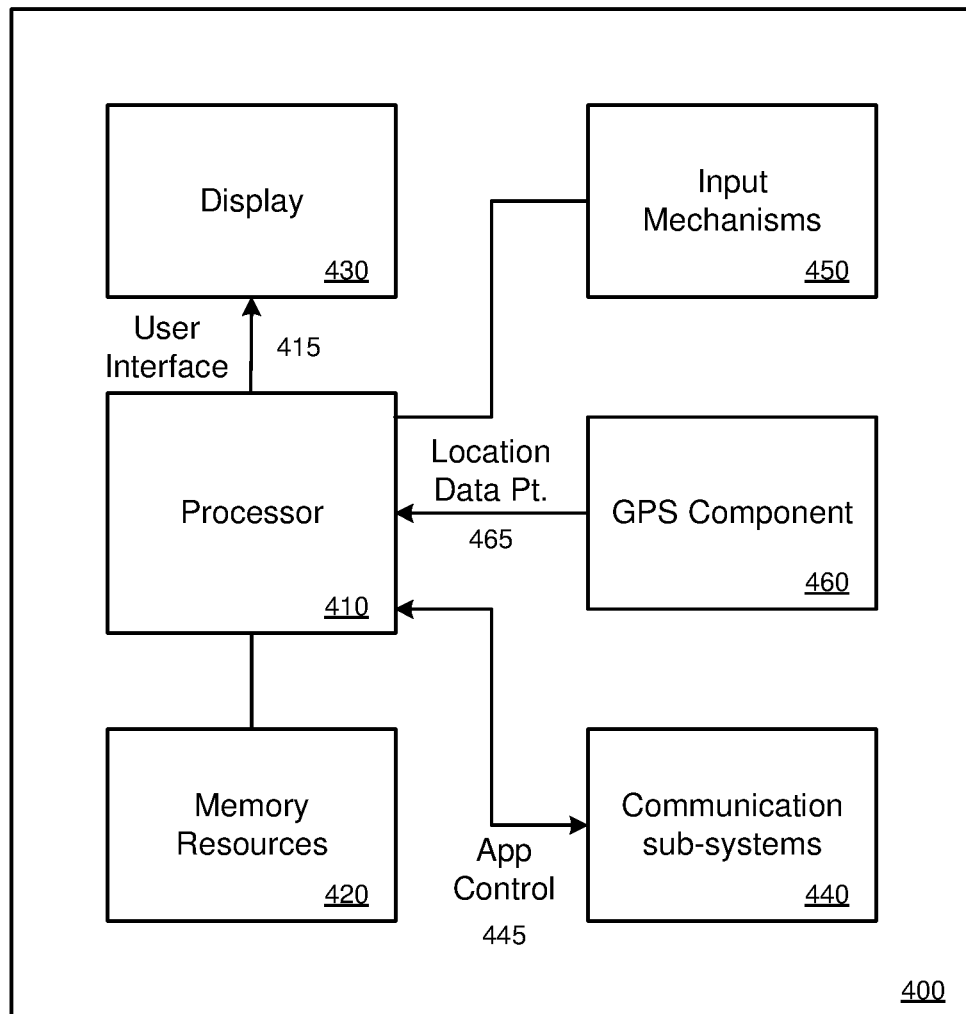
FIG. 4 is a block diagram that illustrates a mobile computing device upon which examples described herein may be implemented.

FIG. 4 is a block diagram that illustrates a mobile computing device upon which examples described herein may be implemented. In one example, a mobile computing device 400 may correspond to a mobile computing device, such as a cellular device that is capable of telephony, messaging, and data services. The mobile computing device 400 can correspond to a client device or a driver device. Examples of such devices include smartphones, handsets or tablet devices for cellular carriers. The mobile computing device 400 includes a processor 410, memory resources 420, a display device 430 (e.g., such as a touch-sensitive display device), one or more communication sub-systems 440 (including wireless communication sub-systems), input mechanisms 450 (e.g., an input mechanism can include or be part of the touch-sensitive display device), and one or more location detection mechanisms (e.g., GPS component) 460. In one example, at least one of the communication sub-systems 440 sends and receives cellular data over data channels and voice channels.

The processor 410 is configured with software and/or other logic to perform one or more processes, steps and other functions described with implementations, such as described by FIGS. 1 through 2, and elsewhere in the application. The processor 410 is configured, with instructions and data stored in the memory resources 420, to operate a designated service application as described in FIGS. 1 through 2. For example, instructions for operating the designated service application in order to display user interfaces 415 can be stored in the memory resources 420 of the mobile computing device 400.

A client or service provider, for example, can operate a respective mobile computing device (such as the mobile computing device 400) to operate the designated client or service provider application, respectively. The GPS component 460 can determine location information, such as the current location information 465 of the computing device 400. The location information 465 can be wirelessly transmitted to the on-demand service system via the communication sub-systems 440 periodically and/or as part of a status message. For example, information about the mobile computing device 400, which can include location information 465, a device type, a user identifier associated with the device 400, and/or a version information for the designated service application, can be transmitted periodically to the on-demand service system. In addition, a service provider can provide status messages (not shown in FIG. 4) to the on-demand service system to indicate, for example, that he or she is available to provide services (e.g., is on duty) or that he or she has completed a service and is idle.

The on-demand service system can receive the information from the mobile computing device 400 and when the system determines that change is to be implemented to an attribute of the on-demand service system, such as to the designated service application stored on the mobile computing device 400, the system can transmit the application control 445, via the communication sub-systems 440, to the mobile computing device 400. The processor 410 can process the application control 445, which can cause a change to be implemented to the designated service application (e.g., turn on or off a user interface feature of the service application, provide a user with another option that was not previously available before the change, etc.).

For example, the processor 410 can provide a variety of content to the display 430 by executing instructions and/or applications that are stored in the memory resources 420. One or more user interfaces 415 can be provided by the processor 410, such as a user interface for the service application. The change can be implemented to a user interface 415. While FIG. 4 is illustrated for a mobile computing device, one or more examples may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computer system comprising:
one or more processors; and
a memory to store a set of instructions;
wherein the one or more processors execute the set of instructions to perform operations that include:
communicating a set of configuration data to one or more user devices, each of the one or more user devices being operable to execute a service application for use with a network service, and wherein the set of configuration data is associated with a value;
wherein each of the one or more user devices implements a change to a corresponding service application by changing the value associated with the set of configuration data, wherein the change to the corresponding service application comprises a newer version of the service application; and
for at least a first device of the one or more user devices, causing the corresponding service application to not implement at least a portion of the change to the corresponding service application by causing the corresponding service application of the first device to implement a prior version of the service application.

2. The computer system of claim 1, wherein causing the corresponding service application of the first device to implement the prior version includes causing the first device to revert back to the prior version, from the newer version.

3. The computer system of claim 1, wherein the operations include:
determining information about how the first device implements the change to the corresponding service application, wherein causing the corresponding service application of the first device to not implement the at least the portion of the change is based on the determined information.

4. The computer system of claim 3, wherein determining the information includes determining that the change to the corresponding service application on the first device is glitchy.

5. The computer system of claim 1, wherein the operations include:
determining information about how multiple devices of the one or more user devices implement the change to the service application, wherein causing the corresponding service application of at least the first device to not implement the at least the portion of the change is based on the determined information.

6. The computer system of claim 1, wherein the value associated with the set of configuration data is a Boolean value.

7. The computer system of claim 1, wherein the value associated with the set of configuration data is a threshold value.

8. A method for operating a computer system, the method comprising:
communicating a set of configuration data to one or more user devices, each of the one or more user devices being operable to execute a service application for use with a network service, and wherein the set of configuration data is associated with a value;
wherein each of the one or more user devices implements a change to a corresponding service application by changing the value associated with the set of configuration data, wherein the change to the corresponding service application comprises a newer version of the service application; and
for at least a first device of the one or more user devices, causing the corresponding service application to not implement at least a portion of the change to the service application by causing the service application of the first device to implement a prior version of the service application.

9. The method of claim 8, wherein causing the corresponding service application of the first device to implement the prior version includes causing the first device to revert back to the prior version, from the newer version.

10. The method of claim 8, further comprising:
determining information about how the first device implements the change to the corresponding service application, and wherein causing the corresponding service application of the first device to not implement the at least the portion of the change is based on the determined information.

11. The method of claim 10, wherein determining the information includes determining that the change to the corresponding service application on the first device is glitchy.

12. The method of claim 8, further comprising:
determining information about how multiple devices of the one or more user devices implement the change to the service application, wherein causing the corresponding service application of at least the first device to not implement the at least the portion of the change is based on the determined information.

13. The method of claim 8, wherein the value associated with the set of configuration data is a Boolean value.

14. The method of claim 8, wherein the value associated with the set of configuration data is a threshold value.

15. A non-transitory computer-readable medium that stores instructions, which when executed by one or more processors of a computer system, cause the computer system to perform operations that include:
communicating a set of configuration data to one or more user devices, each of the one or more user devices being operable to execute a service application for use with a network service, and wherein the set of configuration data is associated with a value;
wherein each of the one or more user devices implements a change to a corresponding service application by changing the value associated with the set of configuration data, wherein the change to the corresponding service application comprises a newer version of the service application; and
for at least a first device of the one or more user devices, causing the corresponding service application to not implement at least a portion of the change to the service application by causing the service application of the first device to implement a prior version of the service application.

16. The non-transitory computer-readable medium of claim 15, wherein the corresponding service application to implement the at least the portion of the change for at least the first device is based on at least one of a threshold associated with the value, a geographic region, a time, a time interval, a device, a device type, one or more users, or a percentage of users.

* * * * *